(12) United States Patent
Newman

(10) Patent No.: US 7,128,831 B2
(45) Date of Patent: Oct. 31, 2006

(54) POLLUTANT CONTAINMENT SYSTEM

(75) Inventor: Alan Paul Newman, Coventry (GB)

(73) Assignee: Coventry University (GB)

( * ) Notice: Subject to any disclaimer, the term of this patent is extended or adjusted under 35 U.S.C. 154(b) by 0 days.

(21) Appl. No.: 10/494,743

(22) PCT Filed: Nov. 11, 2002

(86) PCT No.: PCT/GB02/05105

§ 371 (c)(1), (2), (4) Date: Oct. 15, 2004

(87) PCT Pub. No.: WO03/040483

PCT Pub. Date: May 15, 2003

(65) Prior Publication Data

US 2005/0051480 A1 Mar. 10, 2005

(30) Foreign Application Priority Data

Nov. 9, 2001 (GB) ................................ 0126917.4

(51) Int. Cl.
*B01D 24/38* (2006.01)

(52) U.S. Cl. .................. 210/99; 210/164; 210/170; 210/691; 210/692; 210/693; 210/163; 210/282

(58) Field of Classification Search .................. 210/99, 210/164, 170, 691, 692, 693, 163, 282
See application file for complete search history.

(56) References Cited

U.S. PATENT DOCUMENTS 6,287,459 B1 * 9/2001 Williamson .................. 210/99
6,531,059 B1 * 3/2003 Morris et al. ............... 210/164

* cited by examiner

*Primary Examiner*—Chester T. Barry
(74) *Attorney, Agent, or Firm*—Young Law Firm, P.C.

(57) ABSTRACT

A pollutant containment system for containing the spillage of fuels or other hydrocarbons or the like comprises a first layer (14, 60), a containment vessel (16) for receiving liquid passing through the layer (14) and channelling means (22) for directing liquid permeating through the layer towards the containment vessel (16). The layer (14) provides a plurality of active surfaces for the retention of pollutant and is such as to cause water to permeate through the layer at a flow rate to avoid emulsification of oil and water. Water is introduced into and removed from the containment vessel to raise and lower the water surface thereby to cause the pollutant to be smeared over the active surfaces.

27 Claims, 6 Drawing Sheets

POLLUTANT CONTAINMENT SYSTEM

The present invention relates to a pollutant containment system.

In some situations—refuelling stations, chemical loading bays, surface drainage systems and vehicle parks, for instance—there may be risk of spillage of fluids such as fuel oils and other hydrocarbons. These must be prevented from entering the drainage system and so passing by uncontrolled discharge into the environment, and must be prevented from entering the environment at all without preliminary treatment.

Where there are large areas of conventional, impermeable pavement—motorways, for instance—flash storms may cause such flooding that existing storm-water provisions become overloaded. There have been occasions, too, when emergency treatment of spillage after accidents involving chemical tankers has resulted in serious damage to the environment over wide areas.

Where risks of chemical contamination are low, various forms of porous pavement have been employed, allowing spillage to soak away into the ground beneath. There is, however, a limited rate at which ground can absorb moisture, and there remains a risk of flooding when rainfall is very high. Pollutant containment systems are known which have an upper surface permeable to liquid in order to allow pollutants such as oils to pass through the surface. However, a difficulty with conventional systems is that they do not provide adequate protection to surface and groundwater and the surrounding area in the event of a major leak such as might result from a sump or fuel tank failure from a vehicle or a leakage from a ruptured drum.

The term "pavement" is used herein in its international sense to mean, inter alia, a covering for a street, roadway or other large surface area and particularly such areas which are designed to support repeated vehicular loading.

The term "face velocity" is used herein to refer to the speed at which water passes through the first layer of the system.

The term "pollutant" used herein refers primarily to fuel oils and other hydrocarbons, and includes a mixture of liquid and solids where the solids are held in suspension.

The present invention seeks to provide an improved pollutant containment system.

Accordingly, the present invention provides a pollutant containment system comprising:

a first layer; containment means for receiving water and liquid pollutant passing through said layer; and channelling means for directing water permeating through said layer towards said containment means; wherein said layer provides a plurality of active surfaces for the retention of pollutant and is such as to cause said water to permeate through said layer at a flow rate less than that which would give rise to emulsification of said pollutant.

In a preferred form of the invention said containment means is impermeable to water. It has an upper opening for receiving said liquid and said channelling means extends vertically over said opening thereby to direct liquid permeating through said layer into said containment means. Said channelling means extends into said opening below an upper edge thereof and is generally foil-shaped.

Advantageously, said channelling means has an upper edge extending along a periphery of said first layer. Filter means are provided extending from a side wall of the containment means for filtering liquid overflowing from said containment means. In situ, said containment means rests on a ground surface and said filter means allows infiltration of liquid into the ground. Preferably, said containment means is contained within said layer. Said first layer is formed of particulate material and the surfaces of particle of said particulate material form said active surfaces. At least a portion of said layer may be formed by a polarity of storage elements, each of which has an internal structure providing said active surfaces.

Advantageously, a containment wall extending around the perimeter of said first layer.

Said filter means extends from an upper edge of a side wall of the containment means towards an upper surface of said first layer. Preferably, said filter means extends to said containment wall. In one embodiment, at least one of said channelling means and said containment means is formed by a substantially non-permeable material which may be a geo-membrane. Ideally, said geo-membrane is covered with a geo-textile material.

The system may also include inlet means for introducing water into said containment means, the inlet means comprising at least one pipe.

The present invention also provides a method of containing the spillage of fuels or other hydrocarbons or the like in a system according to the invention comprising introducing water into said containment means whereby pollutant floats on the surface of said water and is retained in said layer on said active surfaces thereby to enable biodegradation of said pollutant.

In a preferred method water is introduced into and removed from said layer to raise and lower the water surface thereby to cause said pollutant to be smeared over said active surfaces. Preferably, said water is introduced into and removed from said containment vessel. The method may also comprise introducing nitrogen and/or phosphorous compounds into said layer to assist biodegradation of said pollutant.

The present invention allows the safe installation of pollutant containment systems where there is a risk of non-aqueous phase pollutants, primarily oils, leaking into the environment.

The present invention is further described hereinafter, by way of example, with reference to the accompanying drawings, in which.

Figure 1:
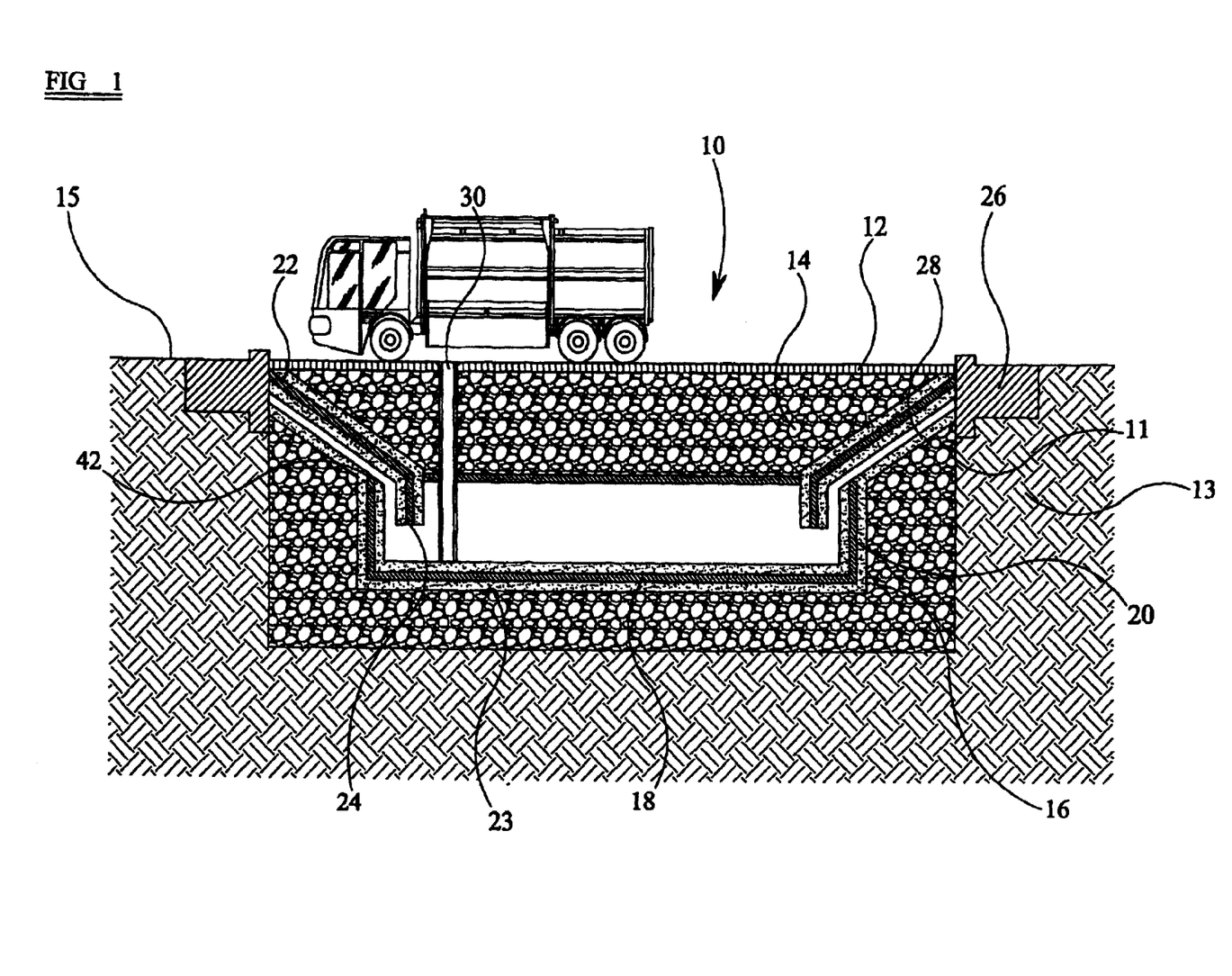
FIG. 1 is a part cross-sectional view of a preferred form of pollutant containment system according to present invention.

Referring to FIG. 1, this shows a cross section through a preferred form of pollutant containment system 10 which has a first, substrate layer 14 supporting an upper, surface layer 12.

As can be seen from the drawing, the substrate 14 is laid in a 'well' 11 which can be excavated in the ground 13 or formed in some other way, for example by retaining walls permeable to water. In the example shown, the well is formed by excavating the ground to the required depth.

The surface layer 12 is a porous layer which is permeable to liquid and forms the pavement. It may be a single sheet laid or cast over the whole of, or a large section of, an area, in which the perforations may conveniently be simple holes. However, it is advantageous to have holes of small span to stop ingress of foreign objects, but of long periphery to facilitate dispersion of the fluid underneath the pavement. Slot-like holes are therefore attractive, and these can conveniently be provided by grooves on the outside of prefabricated pavings.

In a further preferred arrangement, the layer 12 may be formed by discrete pavings of such size and mass as to be convenient to handle continually without fatigue, and designed to be laid close-fitting without mortar or cement. They may be made in any material suitable for any particular application, such as brick, concrete, or cast iron, and must be of sufficient depth to ensure dispersion of the concentrated loads applied. The perforations may be conveniently formed by, for example, gaps between adjacent edges of the paving blocks. The layer 12 may be made of porous concrete or porous asphalt.

The substrate layer 14 is of particulate material whose particles may be non-uniform in shape and which provide interstices between the particles. A typical particle size is in the range 10 mm to 50 mm and the particles may be of mixed sizes. The surface of the particles form an "active" surface over which pollutant can be smeared as it passes through the layer 14, to allow time for biodegradation of the pollutant.

A containment vessel 16 is provided within the substrate layer 14, although it could, of course, be located beneath the substrate layer as part of a containment wall for the substrate layer. The containment vessel 16 is shown as having a base 18 and side walls 20 which extend generally vertically or near vertically from the base 18 (although they may extend at any suitable angle) to form an upper opening or mouth for the vessel. The containment vessel 16 can be of any suitable shape, for example, rectangular or circular of even of 'saucer' shape where the walls and base may merge into one.

The containment vessel 16 should be of sufficient size to contain the level of pollutant which might be expected to be discharged from a major leak from, for example, a sump or fuel tank of a vehicle or from a ruptured drum.

The system also has a channelling means in the form of a second containment vessel 22. This is of funnel-shape and extends from the pavement layer 12 into the first containment vessel 16. The containment vessel 22 has a lower end region in the form of a mouth or opening formed by a lower edge 24 which lies below the mouth of the containment vessel 16. The containment vessel 16, in effect, forms an artificial water table and ideally the lower edge of the second containment vessel 22 extends below the mouth of the first containment vessel 16 by an amount sufficient to allow the level of the water in the containment vessel 16 to rise and fall by a reasonable amount without falling below the mouth of the vessel 22 or rising above the mouth of the vessel 16. Pollutants which are lighter than water will float on the surface of the water and the effect of the raising and lowering of the water level is to 'smear' these pollutants over the active particle surfaces of the substrate. The pollutant can then be acted on by aerobic bacteria which, with the addition of suitable amounts of, for example, nitrogen and phosphorus, can develop on the surface of the substrate material.

The water level can be raised and lowered artificially by introducing it into the material 14 through pipes or the like which extend into the vessel 16 or the material 14 outside the vessel 16 or both. The water can also be introduced at the upper surface of the layer 14 or layer 12 or into an upper region of the layer 14. The raising and lowering of the water level pushes carbon dioxide out of the material 14 and introduces oxygen to assist in the biodegradation of the pollutants.

Pollutants which are heavier then water will sink to the bottom of the vessel 16 and can be removed at some later date.

Both of the containment vessels 16 and 22 are formed of water impermeable material and preferably of oil resistant material. Each may be made from a polymeric geomembrane of welded construction which is covered on both sides with a geotextile material 23 to protect the geomembrane from the substrate material. The containment vessels may also be made of, for example, moulded plastics material. The arrangement of the two containment vessels 16, 22 enables a first vessel 16 to be used which can be considerably smaller than the area to be protected by the system. The second vessel 22 can be used to direct pollutants into the vessel 16 from a larger area than the area immediately above the vessel 16.

A containment wall 26 may be provided, extending around the perimeter or peripheral edge of the pavement layer 12, to provide a water impermeable barrier which contains any spillage of pollutant within the perimeter of the pavement layer 12. The second containment vessel 22 may extend either directly from the junction of the containment wall 26 with the pavement layer 12 or from a point on the inner surface of the containment wall 26 at a level below the pavement layer 12. This ensures that all of the water and pollutant which passes through the porous pavement layer 12 is directed by the second containment vessel 22 into the first containment vessel 16.

The first containment vessel 16 may also be connected to the containment wall 26 by way of a further filter layer 28. This filter layer 28 can be in the form of a geotextile or other filter material. If the vessel 16 overflows, the filter layer 28 allows the overflow water to pass through it and into the surrounding area and eventually to a nearby drain whilst preventing the passage of pollutants. The filter layer can extend from the upper edge or mouth of the first containment vessel 16 to the containment wall 26 and thus provides a space between the filter layer 28 and the second containment vessel 22 in which pollutants can be trapped if the containment vessel 16 overflows. The biological decomposition of the pollutants in this space can be enhanced by introducing nitrogen or phosphorus rich material such as fertilizer into this gap.

An access means such as one or more access or recovery wells 30 is provided to enable an assessment to be made of the water level in the first containment vessel 16. The access well 30 is typically a cylindrical pipe extending from the pavement layer 12 through the substrate 14 and ending close to the bottom of the first containment vessel 16. The pipe is open at each end and over most of its length from its lower end is provided with openings through which the water and pollutants can freely pass. The upper end of the pipe 30 can be covered with an access plate or cover which allows ready inspection of the interior of the pipe 30. The access well 30 also allows quick and easy removal of excess water and pollutants from the containment vessel 16 using, for example, a skimmer pump.

A discharge pipe or pipes (not shown in the drawing) can additionally or alternatively be connected to the first containment vessel 16, opening into the vessel at a position which is normally below the water level but above the normal depth of solid pollutants at the bottom of the vessel 16 in order to enable excess water to be drawn off.

As is mentioned above, enhanced bioremediation may be effected by raising and lowering the surface of the water retained in the containment vessel 16 in order to cause the pollutants which float on the surface of the water to be smeared over the particulate material of the substrate 14. This raising and lowering of the water level can be effected artificially by introducing water and removing it or by allowing rainwater to accumulate and dissipate. Suitable amounts of nitrogen and phosphorous compounds can be introduced either through the porous pavement layer 12 or through various access means into the gap between the filter layer 28 and the second containment vessel 22 to assist biodegradation.

In use, if a large spill of, for example, oil were to take place on the porous pavement 12, this would pass through the pavement 12 and into the substrate 14 and would be directed towards the containment vessel 16 via the second containment vessel 22 in order to prevent it infiltrating directly into the surrounding ground.

If water were to pass rapidly through the substrate, for example as a result of heavy rainfall or the spraying of water onto the upper surface layer 12, the oil on the active surfaces would be captured by the water and would become emusified making separation of the oil and water very difficult, if not impossible, in the system. However, the nature of the substrate means that the water permeates through the substrate with a very low face velocity i.e. at a flow rate which is low enough to avoid emulsification of the oil taking place. As a result, the oil and water remain separated in the substrate. The irregular nature of the shape of the particulate material used in the substrate 14 and the resulting formation of interstices within the substrate means that the path followed by oil and water droplets as they permeate through the substrate is significantly greater than would otherwise be the case.

Pollutants which float on the surface of the water would be 'smeared' over the particulate material of the substrate for biodegradation. Any overflow from the containment vessel 16 would be trapped by the filter layer 28 for further biodegradation. Heavy pollutants which sink to the bottom of the containment vessel 16 can be removed by way of the access well 30, if necessary, as can excess water. In the illustrated example of FIG. 1, water infiltrates into the surrounding ground 13 after overflowing from the vessel 16 and the provision of one or more discharge pipes can assist in the water removal from the vessel 16.

Figure 2:
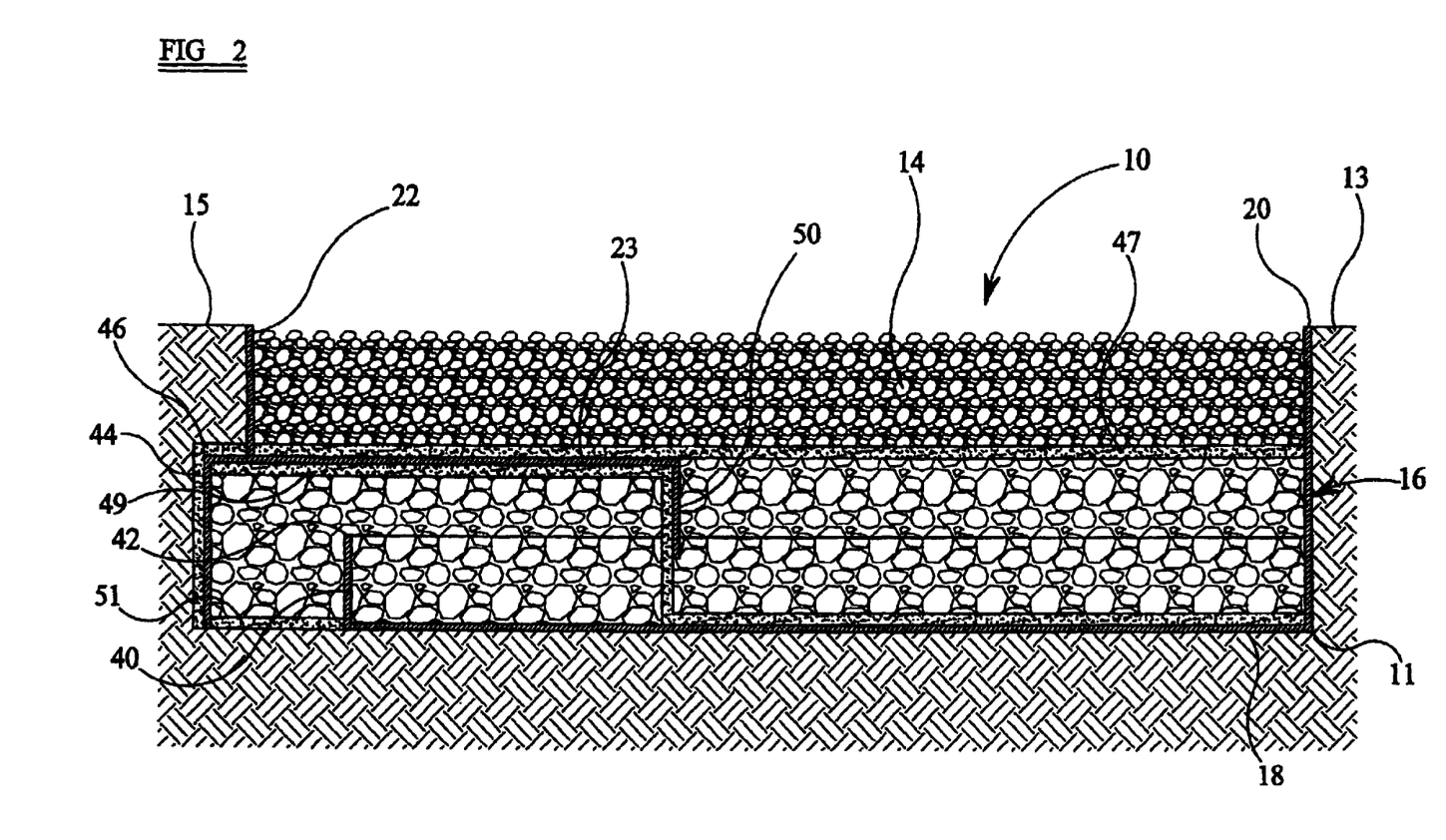
FIGS. 2 to 6 are views, similar to that of FIG. 1, showing further embodiments of pollutant containment systems according to the present invention.

FIG. 2 is a view to that similar to that of FIG. 1 showing a second embodiment of pollutant containment system according to the present invention. Parts of FIG. 2 corresponding to parts in FIG. 1 are given like reference numbers.

Whilst the system of FIG. 1 is intended to be more or less a permanent structure with a load bearing upper surface layer 12, the system of FIG. 2 may be used in situations where a temporary structure is required. This could be, for example, during building construction in areas where the constructors vehicles are parked or are driven.

In the system of FIG. 2 the layer 12 is omitted and the substrate material 14 provides the upper, load-bearing surface. The containment vessel 16 is located within well 11 which has been excavated in the ground. It will, of course, be appreciated that the well 11 could equally be formed by a structure which has been built for the purpose.

The containment vessel 16 is of generally rectangular or square shape and has a base 18 with three side walls 20 extending to the ground surface 15. The three side walls 20 conveniently lie against or adjacent side walls of the well 18. However, the fourth wall 40 of the vessel 16 is spaced from the adjacent side wall of the well and terminates in an upper edge 42 which is well below the ground surface 15. The second containment vessel 22 has a generally vertical wall 44 which extends the full depth of the well 11. In the example of FIG. 2 this wall is stepped at 46 but this is not essential.

The vessel 22 also has a generally horizontal base 23 which overlies the wall 40 of vessel 16 and has a depending wall 50 extending into the containment volume of the vessel 16 but which terminates above the base 18 of the vessel 16.

The wall 44 forms the fourth wall of the containment system 10 and connects with the two adjacent walls 20 of the vessel 16. The extension 48 also extends the full length of the wall 44, as does the wall 50.

The whole of the volume within the well is filled with the particulate material 14.

The arrangement of the vessels 16 and 22 is such that the latter directs flow of liquid (water and pollutants) percolating through the material 14 into the vessel 16. The side walls 20 and 44 prevent any spillage on the material 14 from infiltrating directly into the surrounding ground.

In addition, a layer 47 of geotextile material covers the upper surface of the base 23 and may extend across the vessel 16 to the opposite wall 20 to act as a filter.

A further layer 49 of geotextile material also covers the undersurface of the base 23 and extends along the surface of the wall 50 to the base 18 where it extends to the walls 20.

The bottom of the well between the wall 40 and the wall 44 is covered by a geotextile material layer 51 to allow infiltration of water from the material 14 into the ground. Additionally or alternatively, one or more pipes or other conduits can be used to carry water away from the volume between the walls 44 and 40. A perforated pipe or conduit extending into the volume between the walls 44 and 40 would be suitable. The same pipes could be used to introduce water.

The geotextile layers serve as filters and also to protect the surface of the vessels 16, 22 where the layers are provided. They may of course be of any suitable material and not necessarily geotextile material.

The system of FIG. 2 operates in the same manner as the system of FIG. 1. Pollutant and water separate as they pass slowly through the material 14. The water fills the vessel 16 and overflows the wall 40 to infiltrate into the ground through the layer 51. The layers 47, 49 and 51 provide additional filtering for the water.

Figure 3:
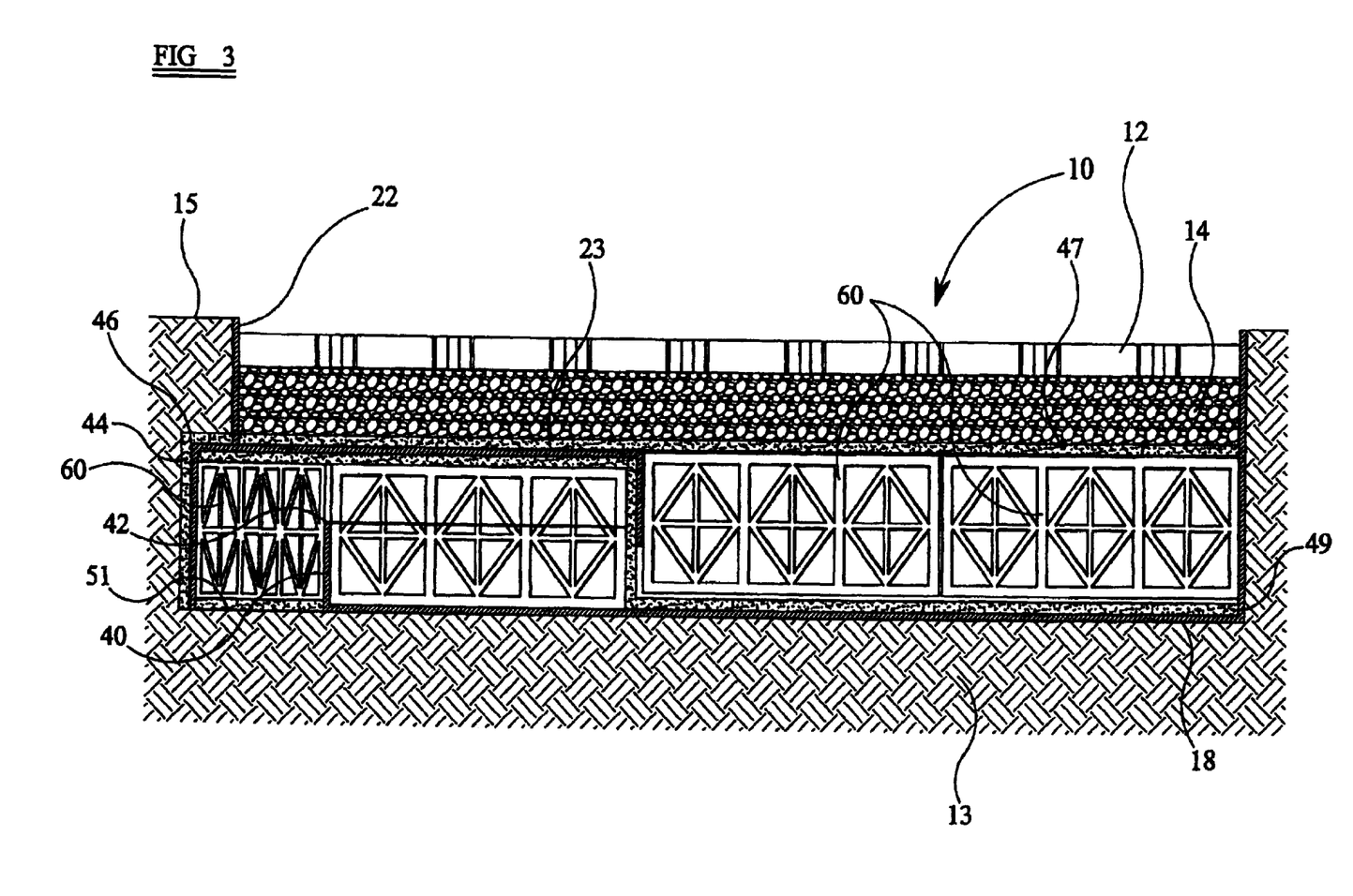

Referring now to FIG. 3, this is a system similar to that of FIG. 2 but which has an upper, load-bearing layer 12 as in the system of FIG. 1. The arrangement of the vessels 16 and 22 and the geotextile layers is the same as in FIG. 2 but the "substrate" is formed by two layers. The first is formed by the particulate material 14 which supports the layer 12 and lies between the layer 12 and the geotextile layer 47. The second layer is formed by what are termed hollow storage elements 60 which fill the volume beneath the base 23 and the geotextile layer 47.

The storage elements 60 are generally made of plastics material and are of regular shape (typically square or rectangular cross section). They have an internal structure which provides a plurality or myriad of tortuous or winding paths between upper and lower surfaces for the water and oil to percolate slowly through the structure, ensuring a low face velocity and thus separation of the pollutant and water. The internal structure of the storage elements 60 may, for example, be in the form of small, interconnected cavities, or a latticework. The elements 60 may be commercial "plastic honeycomb" systems and one such element is a box structure known as "Permastore". The elements provide the "active" surfaces on the internal walls of the cavities and interstices formed within the elements.

Figure 4:
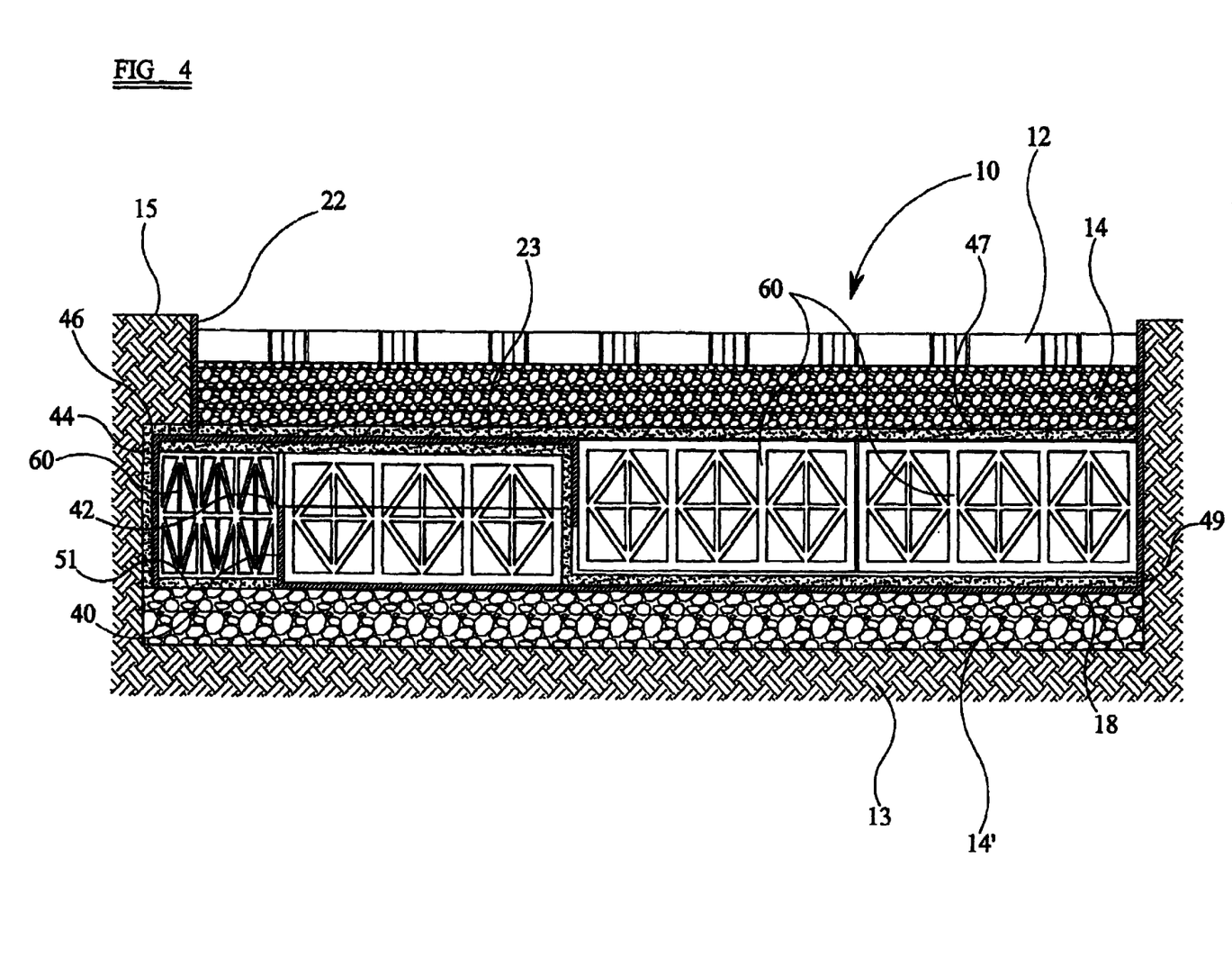

The system of FIG. 4 is similar to that of FIG. 3 with the exception that a further layer of particulate material 14' is provided beneath the base 18 of the vessel 16 and the geotextile layer 51. This additional layer 14' serves as a supporting layer and allows water permeating through the geotextile layer 51 to flow laterally and infiltrate the ground over a wider area. This enables the water to be conducted away from the layer 51 more quickly, allowing the system to cope with larger volumes of water.

Figure 5:
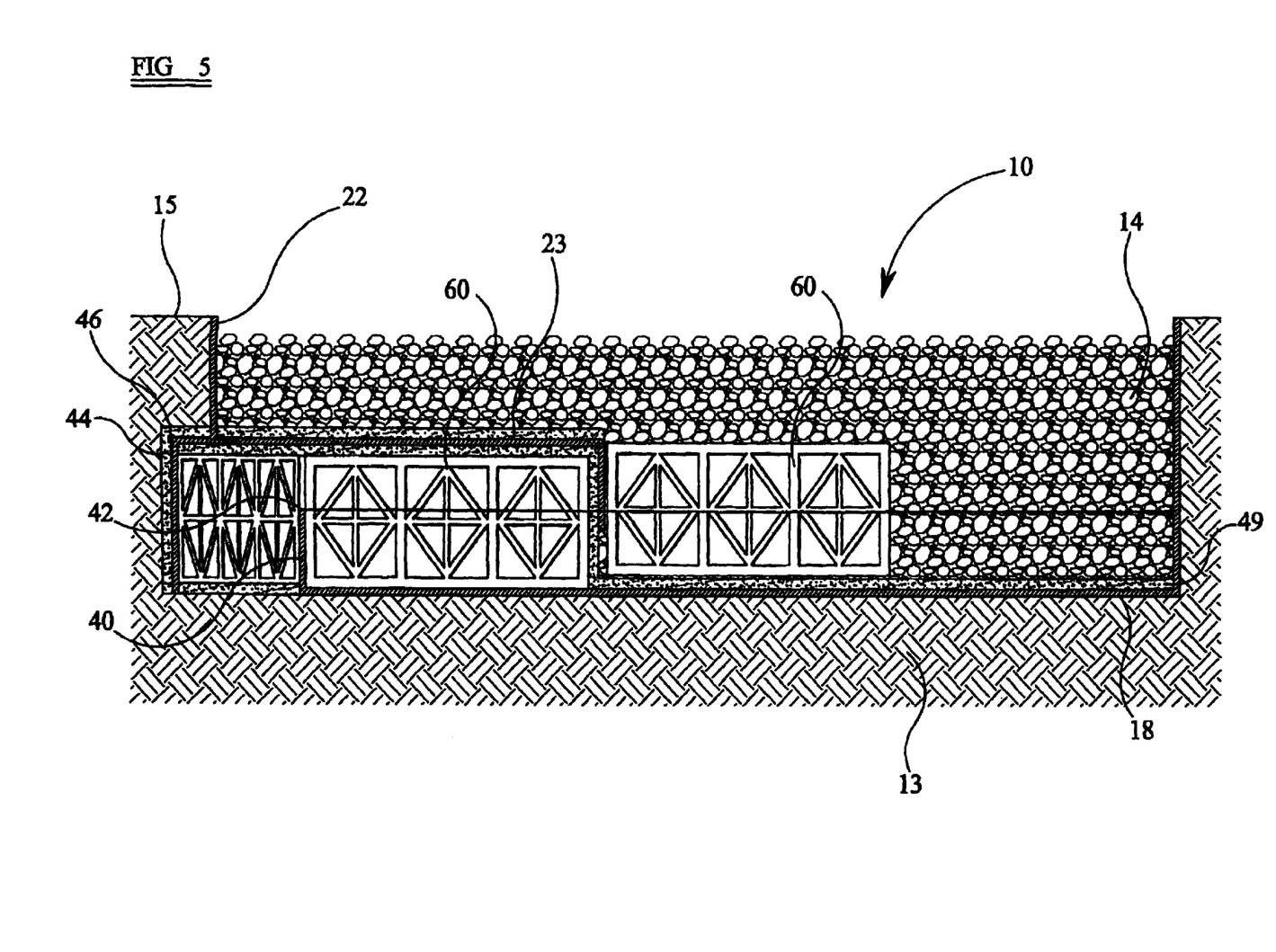

FIG. 5 is a system similar to that of FIG. 3. However, in FIG. 5 the upper surface layer 12 is again omitted. In addition, the geotextile layer 47 is omitted and one or more of the storage elements 60 are replaced with particulate material 14. In the illustrated example, one or more of the storage elements 60 in the volume bounded by the walls 20 and 50 are omitted but any one or more of the storage elements can be replaced by material 14.

Figure 6:
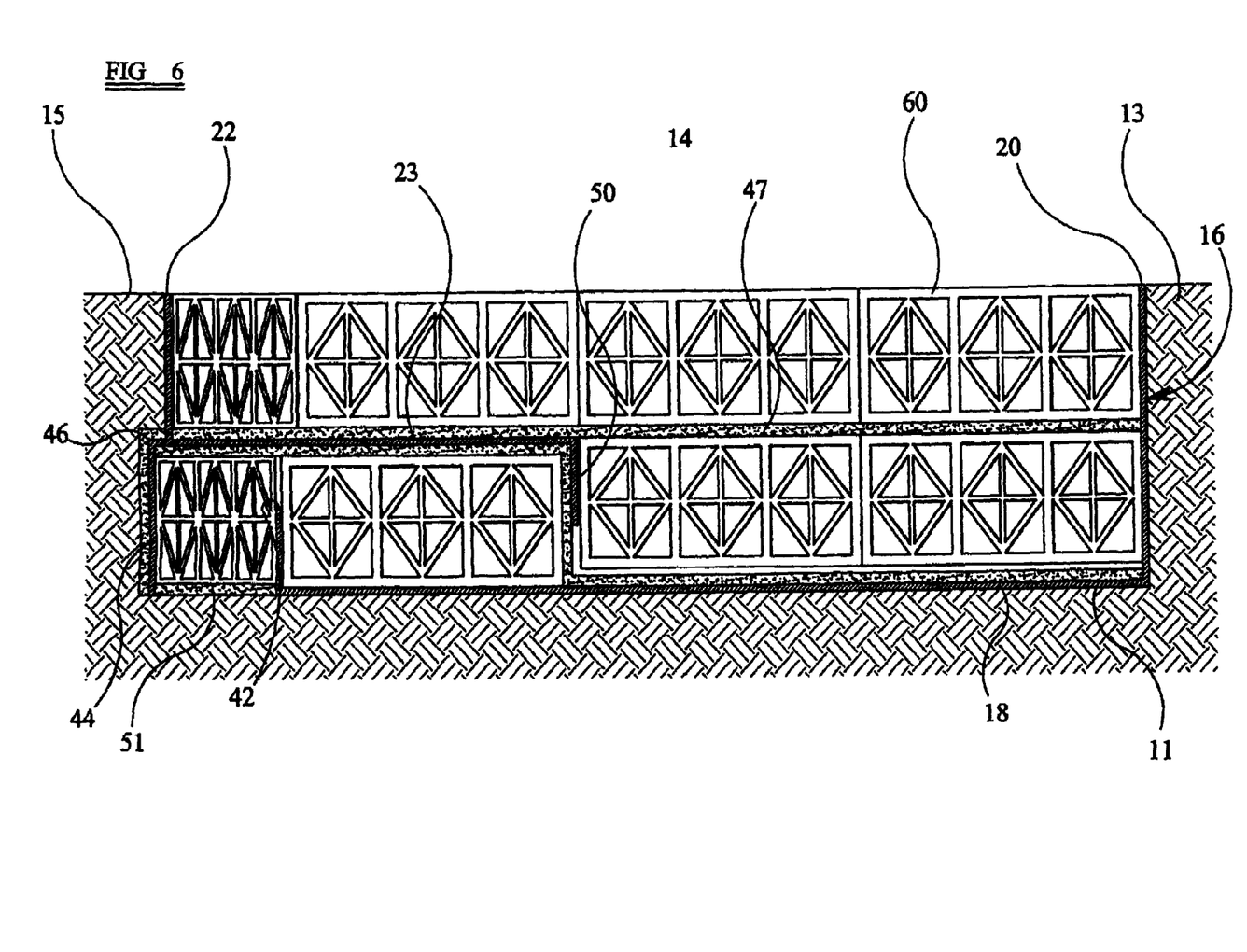

The system of FIG. 6 is a system similar to that of FIG. 2 but with the particulate material 14 replaced by layers formed by storage elements 60.

The above described embodiments can be strong enough for vehicular loading and can therefore be used in, for example, permanent or temporary car and goods vehicle parks. However, they can also be used in areas which are not intended to take vehicles. One example would be an area where one or more fuel tanks are stored for providing fuel for, for example, heating or generators.

It will be appreciated that various combinations of the systems shown in FIGS. 1 to 6 can be used and features of the various embodiments can be combined with one another.

The size of the above-described system is determined by the amount of pollutant (oil) retention that will be required from the predicted spill that might take place, and also to ensure sufficient depth such that the water in the vessel 16 is protected from freezing in winter. The first containment vessel 16 is conveniently positioned at a sufficient depth to avoid freezing and minimising evaporation of the water in the containment vessel.

The above-described system avoids the extra cost of an additional oil interceptor and can trap large amounts of pollutants without the risk of the surrounding area or drainage systems being contaminated. The system provides protection from spillages until the design volume is exceeded. Ideally, the system is constructed in order to maintain a permanent level of water in the containment vessel 16.

It will be appreciated that the vessel 22 can, as described, extend the full width of the vessel 16 or only a portion. In the latter case the vessel 16 will have additional side walls 20 meeting the wall 44 and the vessel 16 will be shaped accordingly.

It will also be appreciated that the above described containment systems are self contained in that they are intended to contain any spillage on the upper surface of the system and to this end are provided with water impermeable barriers or retaining walls around the system.

Each vessel 16 and 22 can be constructed from component parts for assembly on site. They can also be constructed from, for example, concrete or other building material with a water impervious coating or layer attached, or a substantially non-permeable material such as a geomembrane.

Where the well 11 is formed by a retaining wall then there would need to be provision made for the infiltration of water into the surrounding ground. This could be effected by way of the aforementioned discharge pipes but equally the wall could be porous.

The invention claimed is:

1. A pollutant containment system comprising:
   a first layer (14, 60);
   containment means (16) for receiving and retaining water and/or oil passing through said layer (14);
   and channelling means (22) for directing said water and/or oil permeating through said layer towards said containment means (16), said channelling means having a lower region comprising an opening formed by a lower edge (24);
   wherein said layer is formed of a material having interstices providing a plurality of winding paths throughout said layer (14, 60) thereby to cause said water and/or oil to permeate slowly through said layer at a flow rate below which emulsification of water and oil takes place, the surface of said material serving as a plurality of active surfaces for the retention of oil smeared thereon
   and wherein said lower end region extends below a mouth of the containment means (16) by an amount sufficient to allow water to be retained by the containment means (16) at a level above the lower edge.

2. A system as claimed in claim 1 wherein said containment means (16) is impermeable to water.

3. A system as claimed in claim 1 wherein said containment means (16) has an upper opening for receiving said liquid and said channelling means (22) extends vertically over said opening thereby to direct liquid permeating through said layer into said containment means (16).

4. A system as claimed in claim 3 wherein said channelling means extends into said opening below an upper edge thereof.

5. A system as claimed in claim 3 wherein said channelling means (22) is generally funnel-shaped.

6. A system as claimed in claim 1 wherein said channelling means (22) has an upper edge extending along a periphery of said first layer (14).

7. A system as claimed in claim 1 further comprising filter means (28, 51) extending from a side wall of the containment means (16) for filtering liquid overflowing from said containment means.

8. A system as claimed in claim 7 wherein, in situ, said containment means (16) rests on a ground surface and said filter means (28, 51) allows infiltration of liquid into the ground.

9. A system as claimed in claim 1 wherein said containment means (16) is contained within said layer (14).

10. A system as claimed in claim 1 wherein said first layer (14) is formed of particulate material and the surfaces of particle of said particulate material form said active surfaces.

11. A system as claimed in claim 1 wherein at least a portion of said layer (14) is formed by a plurality of storage elements, each of which has an internal structure providing said active surfaces.

12. A system as claimed in claim 1 comprising a containment wall extending around the perimeter of said first layer (14).

13. A system as claimed in claim 7 wherein said filter means (28) extends from an upper edge (42) of a side wall (40) of the containment means (16) towards an upper surface of said first layer (14).

14. A system as claimed in claim 7 wherein said filter means (28) extends to said containment wall.

15. A system as claimed in claim 1 wherein at least one of said channelling means (22) and said containment means (16) is formed by a substantially non-permeable material.

16. A system as claimed in claim 15 wherein said material is a geomembrane.

17. A system as claimed in claim 16 wherein said geomembrane is covered with a geotextile material.

18. A system as claimed in claim 1 comprising inlet means for introducing water into said containment means (16).

19. A system as claimed in claim 18 wherein said inlet means comprises at least one pipe.

20. A system as claimed in claim 1 comprising access means (30) extending through said layer (14) into said containment means (16) for enabling removal of water or surface pollutant directly from said containment means.

21. A system as claimed in claim 20 wherein said access means is a pipe.

22. A method of containing the spillage of fuels or other hydrocarbons in a system as claimed in claim 1 comprising introducing water into said containment means (16) whereby pollutant floats on the surface of said water and is retained in said layer (14) on said active surfaces thereby to enable biodegradation of said pollutant.

23. A method as claimed in claim 22 further comprising introducing and removing water into and from said layer to raise and lower the water surface thereby to cause said pollutant to be smeared over said active surfaces.

24. A method as claimed in claim 23 wherein said water is introduced into and removed from said containment vessel (16).

25. A method as claimed in claim 22, further comprising introducing nitrogen and/or phosphorous compounds into said layer (14) to assist biodegradation of said pollutant.

26. A method as claimed in claim 22 wherein said water is introduced into an upper region of said layer 14.

27. A method of containing the spillage of fuels or other hydrocarbons comprising providing a system as claimed in claim 1, and introducing water into said layer 14 to cause pollutant to float on the surface of said water at a level above said lower edge, and thereby to be retained in said layer (14) on said active surfaces to enable biodegradation of said pollutant.

* * * * *